US005218675A

United States Patent [19]

Arai et al.

[11] Patent Number: 5,218,675

[45] Date of Patent: Jun. 8, 1993

[54] INFORMATION DISPLAY SYSTEM SUITABLE FOR COMPACT ELECTRONIC APPLIANCES HAVING DIFFERENT DISPLAY SIZES

[75] Inventors: Tatsuo Arai; Yuji Kuriyama, both of Tokyo, Japan

[73] Assignee: Casio Computer Co., Ltd., Tokyo, Japan

[21] Appl. No.: 780,521

[22] Filed: Oct. 17, 1991

Related U.S. Application Data

[63] Continuation of Ser. No. 538,933, Jun. 15, 1990, abandoned.

[30] Foreign Application Priority Data

Jun. 29, 1989 [JP] Japan .............................. 1-75570[U]
Jun. 29, 1989 [JP] Japan .............................. 1-168125

[51] Int. Cl.[5] .................... G06F 15/00; G06F 12/00

[52] U.S. Cl. .................... 395/166; 395/164; 395/148; 340/750; 340/730

[58] Field of Search .............. 340/747, 750, 790, 730, 340/731; 395/162, 164, 166, 148, 144, 145

[56] References Cited

U.S. PATENT DOCUMENTS 4,947,342 8/1990 Katsura et al. .................... 364/518
4,949,279 8/1980 Takakura et al. .................. 364/518
5,005,137 4/1991 Ernst ................................ 364/514

*Primary Examiner*—Phu K. Nguyen
*Attorney, Agent, or Firm*—Frishauf, Holtz, Goodman & Woodward

[57] ABSTRACT

In a compact electronic appliance having a display unit, a size of the display unit is stored by specifying, for example, a line number and a column number for a screen display. A judgment is made whether or not the inputted character position exceeds the line number and column number while inputting display information on the display unit. An external storage medium, such as a so-called IC card, stores the display information, monitors a judgment result made by the compact electronic appliance, and controls a transfer of the display information in accordance with the judgment result. Even when the display information is applied to screen to different sizes, the display information can, nevertheless, be properly displayed.

8 Claims, 7 Drawing Sheets

| DISPLAY UNIT FORM | A-TYPE | B-TYPE |
|---|---|---|
| VRAM'S TOP ADDRESS | 0000 | 0000 |
| VRAM'S END ADDRESS | 017F | 03FF |
| DOT NUMBER IN VERTICAL DIRECTION | 48 | 64 |
| DISPLAY DIGIT NUMBER | 8 | 16 |
| DISPLAY LINE NUMBER | 3 | 4 |

FIG. 3

| | | | | | | | | | | | | | | | |
|---|---|---|---|---|---|---|---|---|---|---|---|---|---|---|---|
| N | U | M | B | E | R | ↵ | 0 | 1 | 2 | 3 | 4 | 5 | 6 | 7 | 8 |
| 9 | ↵ | A | L | P | H | A | B | E | T | ↵ | A | B | C | D | E |
| F | G | H | I | J | K | L | M | N | O | P | Q | R | S | T | U |
| V | W | X | Y | Z | ↵ | a | b | c | d | e | f | g | h | i | j |
| k | l | m | n | o | p | q | r | s | t | u | v | w | x | y | z |

FIG. 4

INFORMATION DISPLAY SYSTEM SUITABLE FOR COMPACT ELECTRONIC APPLIANCES HAVING DIFFERENT DISPLAY SIZES

This application is a continuation of application Ser. No. 07/538,933, filed Jun. 15, 1990.

BACKGROUND OF THE INVENTION

1. Field of the Invention

The present invention generally relates to a display system for a compact electronic appliance. More specifically, the present invention is directed to an information display system used for such compact electronic appliances equipped with display units having different display sizes and capable of properly displaying display information which is received from the same display information source.

2. Related Art of the Invention

In general, conventional compact electronic appliances for displaying characters employ dot matrix type liquid crystal display apparatuses as display units. The data to be displayed, for instance character code, are converted into image data or bit patterns, and the converted display data are stored in the screen memory corresponding to the dots constituting the liquid crystal display panel, and thereafter the display operation is performed in accordance with the contents of this screen memory.

On the other hand, since many consumers have expressed a need for more easily observable display screens, the sizes of the present display screens are being enlarged without changing the basic functions of the display system. In such a case, although there is no modification in the calculation control and memory control, either control unit or LSI employed in the electronic appliance must be discretely prepared so as to be fitted to the modification of the display apparatus. Therefore, there exists such an economical problem that the design of LSI employed in the display apparatus must be modified in order to accept such a slight change in the display screen size.

Furthermore, very recently an information processing apparatus has been marketed that can execute a program previously stored in an external storage medium, for instance, an IC card, while connecting the IC card to this information processing apparatus.

In accordance with such an information processing apparatus, when the program stored in the IC card is executed, e.g. information display program is executed, the display data is received from the IC card together with the information on the line number and column number for the display purpose, and the display data is merely displayed on the designated position of the display unit.

However, there are various information processing apparatuses in the same series but of different size. As a consequence, when, for instance, such a program to display data of a 3-line×5-column display unit has been stored in an IC card, the overall screen of this display unit can be effectively utilized so as to display this display data only under the condition that the screen size of the display unit is 3 lines×5 columns. To the contrary, when other differently sized display units, for example, a screen size of 4 lines×10 columns are employed instead of the above-described screen size of 3 lines×5 columns, and the above-described IC card is utilized, the display data is displayed only within a display area of 3 lines×5 columns. This may cause insufficient display of the effective display range of the display unit, and also worse display appearances of the display data.

SUMMARY OF THE INVENTION

The present invention has been made in an attempt to solve the above-described problems of the conventional information display apparatus, and has an object to provide an information display system capable of displaying information properly even when the compact electronic appliances employ a display unit having different size dimensions.

A display system, according to the present invention, comprises:

display range memory means for storing therein data representative of a display range including at least a display column number and a display line number of a display screen of the display unit;

display position data memory means for storing therein column position and line position data of the display screen, which designate a display position of the character data read out from the memory means;

first comparing means for comparing the column position data stored in the display position data memory means with the display column number stored in the display range memory means;

second comparing means for comparing the line position data stored in the display position data memory means with the display line number stored in the display range memory means; and, control means for controlling both rewriting the column position and line position data stored in the display position data memory means and writing the character data to be into the display unit.

Furthermore, in accordance with the present invention, a compact electronic appliance comprises:

1) a liquid crystal display device including: a liquid crystal display panel; display memory means for storing information to be displayed on said liquid crystal display panel;

liquid crystal drive means for driving said liquid crystal the memory information stored in said display memory means; and, form memory means for storing form information of said liquid crystal display device, 2) a display information supplying apparatus including:

means for reading out the form information from the form memory means of said liquid crystal display device; and, output means for outputting the display character information on said liquid crystal display device in accordance with the read form information.

BRIEF DESCRIPTION OF THE DRAWINGS

The present invention will now be described further by way of samples only and with reference to the accompanying drawings, in which:

FIG. 3 illustrates contents of a display form memory unit employed in the compact electronic appliance shown in FIG. 1;, FIG. 4 represents display information which has been stored in a memory of an IC card;

DETAILED DESCRIPTION OF THE PREFERRED EMBODIMENT

CONSTRUCTION OF COMPACT ELECTRONIC APPLIANCE

Referring now to figures, a compact electronic appliance employing an information display system according to a first preferred embodiment of the present invention will be described.

Figure 1:
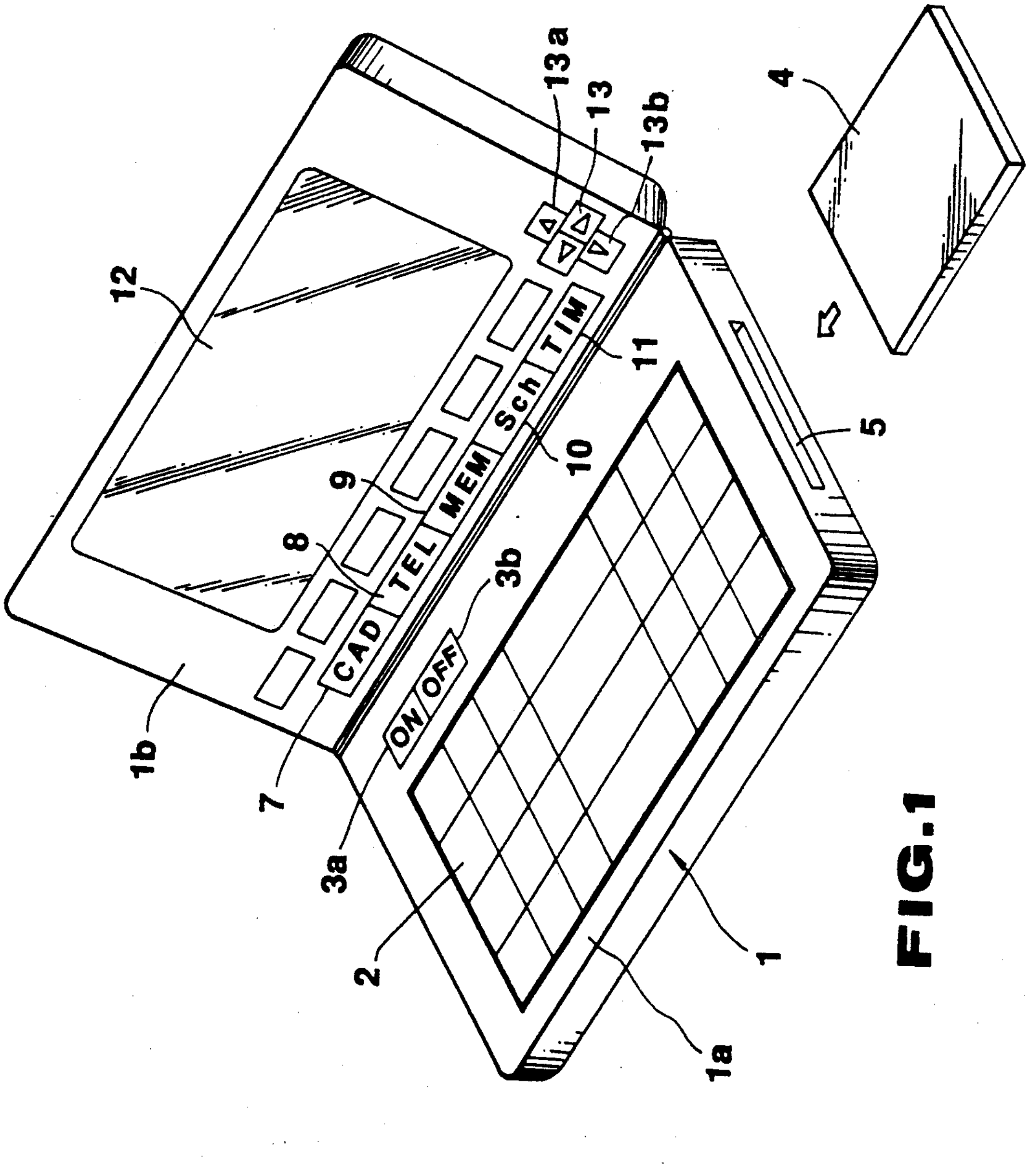
FIG. 1 is a perspective view of a compact electronic appliance to which the present invention has been applied.

FIG. 1 is a perspective view of the first compact electronic appliance. In FIG. 1, reference numeral 1 indicates an apparatus housing which is constructed of a main body 1*a*, and a lid 1*b* hinged to the main body 1*a*. On the surface of this main body 1*a*, there are formed a keyboard 2, a power-ON switch 3*a*, and a power-OFF switch 3*b*, whereas a card loading unit 5 is formed on one side surface of the main body la (right side as viewed in FIG. 1) so as to load an IC (integrated circuit) card 4. At an inner surface of the lid lb, there are formed in an array form a card (CAD) key 7 for setting a card mode; a TEL key 8 for setting a telephone mode; an MEM key 9 for setting a memo mode; a Sch key 10 for setting a schedule mode; and, a TIM key 11 for setting a time mode, and also a liquid crystal display panel 12 for displaying various data thereon. Furthermore, cursor keys 13, 13*a* and 13*b* constructed of four switch pieces are formed beside the various function setting keys. "↑" key 13*a* and "↓" key 13*b* supply a direction of display scrolling in the card mode.

OVERALL CIRCUIT ARRANGEMENT

Figure 2:
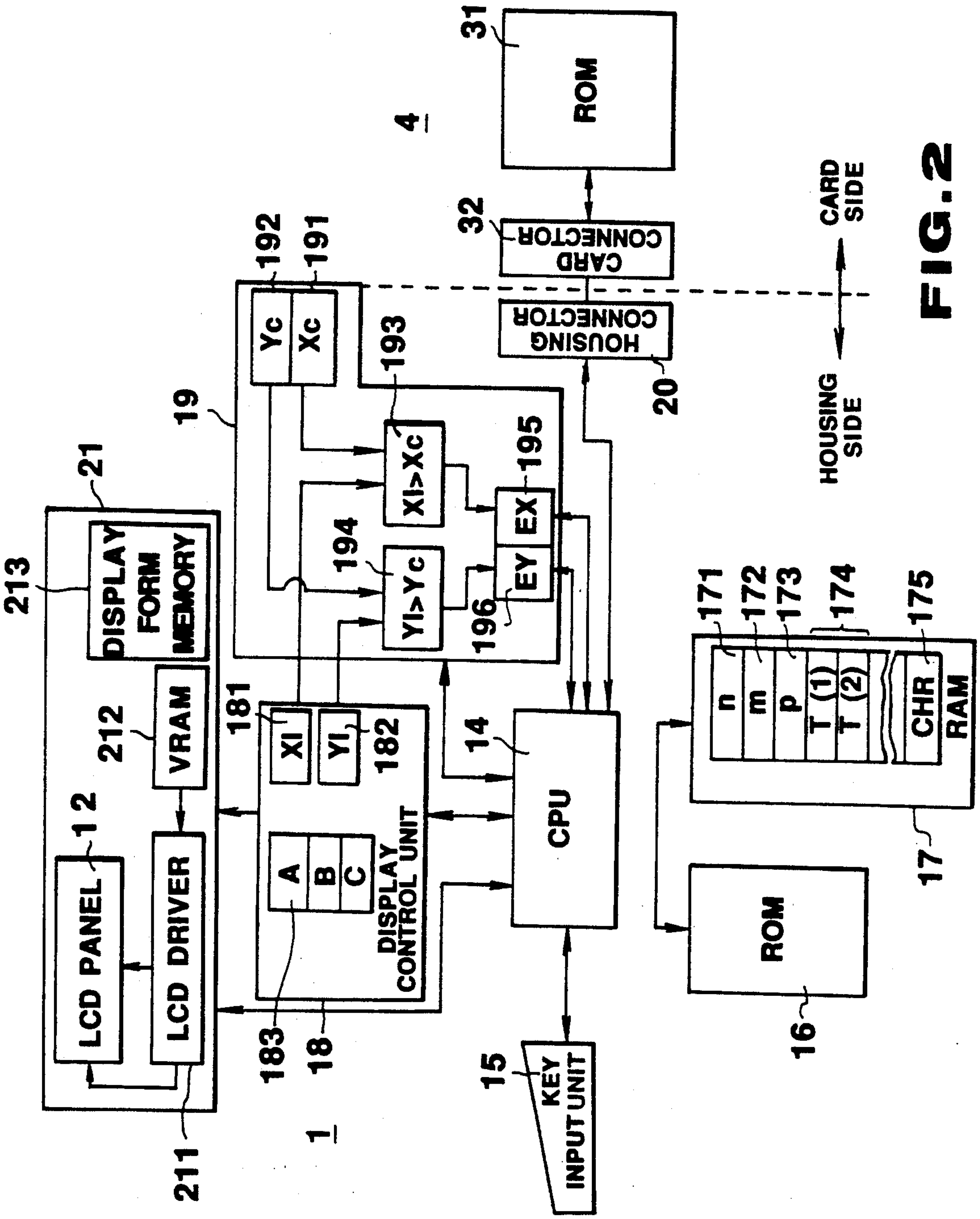
FIG. 2 is a schematic block diagram of a circuit arrangement of the compact electronic appliance to which the present invention has been applied.

In FIG. 2, there is shown an overall circuit arrangement of the compact electronic appliance shown in FIG. 1. This circuit is arranged with a central processing unit (CPU) 14 to which a key input unit 15, a ROM (read-only memory) 16, a RAM (random access memory) 17, a display control unit 18, a read control unit 19, and a housing connector 20 are connected.

It should be noted that the above-described key input unit 15 corresponds to the previously explained keyboard 2, cursor key 13, and various keys 7 to 11. ROM 16 has had previously stored therein a program for controlling various functions of the appliance, and a conversion table for converting a character code into a character pattern. In RAM 17, there are provided areas capable of storing various data; a display starting line pointer (n) 171, a display line pointer (m) 172, and a character pointer (p) 173. RAM 17 further includes area T(1), T(2), - - - , 174 for buffering character pointer data of head character of each line; and a display character code register (CHR) 175. The data stored in RAM 17 are used for controlling the displays of various data sent from the IC card 4.

The compact electronic appliance shown in FIG. 1 further includes a display unit 21. The display unit 21 includes an LCD panel 12, an LCD driver 211 for driving the LCD panel 12, a VRAM 212, and a display form memory 213. The VRAM 212 stores image data to be displayed on the LCD panel 12.

The function of the display form memory unit 213 is to store a form or specifications of this display unit 21. FIG. 3 shows contents of the memory of different type display, i.e. A-type and B-type. There are differences in both the data of the character to be displayed and the address data, depending upon sizes of the display panel 12.

The display control unit 18 includes a memory unit 183. A VRAM's top address, a VRAM's end address, and a dot number in the vertical direction of the LCD panel 12 are written in memory areas A, B and C from the display form memory unit 213. Based upon the written data, the display control unit 18 executes both the data write control and display control with respect to the display unit 21. Furthermore, under the control of the display control unit 18, both digit designation data (XI) and line designation data (YI) used to write the character data into VRAM 212 are stored in a digit position memory 181 and a line position memory 182. These digit designation data (XI) and line designation data (YI) are supplied to the read control unit 19.

The read control unit 19 includes a memory 191 for storing a digit number data (Xc) of the display unit 21, and a memory 192 for storing a line number data (Yc), comparator units 193,194 and error flag memories (EX) 195 and (EY) 196.

Then, the digit designation data (XI) and the line designation data (YI) are supplied to the comparator units 193 and 194. The first comparator unit 193 compares the digit number data (Xc) stored in the memory 191 with the digit designation data (XI) stored in the digit position memory 181. When a comparison result becomes $XI>Xc$, a flag is stored in an error flag memory (EX) 195. The second comparator unit 194 compares the line number data (Yc) stored in the memory 192 with the line designation data (YI) stored in the line position memory 182. When a comparison result becomes $YI>Yc$, another flag is set into another error flag memory (EY) 196.

On the other hand, the IC card 4 is constructed of a ROM 31 and a card connector 32. It should be noted that, for instance, display information as shown in FIG. 4 has been stored in ROM 31, and also a program by which such display information can be displayed has been previously stored therein. The card connector 32 is employed so as to connect the IC card 4 via the housing connector 20 to the housing 1.

It should also be noted that a symbol ↵ shown in FIG. 4 indicates a line-feed code.

OVERALL OPERATION OF COMPACT ELECTRONIC APPLIANCE

Referring now to FIGS. 1 to 4 in conjunction with a flowchart shown in FIG. 5, a description will be made such that while the IC card 4 is loaded on the housing 1, the information (see FIG. 4) stored in the IC card 4 is displayed on the display panel 12 of the compact electronic appliance. In this preferred embodiment, it should be noted that the display unit 21 utilizes an "A" type form shown in FIG. 3. In this display unit 21, there is employed a $48\times64$ dot matrix as the LCD (liquid crystal display) PANEL 12. One character is constructed of $16\times8$-dot patterns, and a character display is effected by 3 lines$\times$8 columns. Accordingly, VRAM 212 has a memory capacity of $48\times64$ bits. In this VRAM 212, a top address "0000" designates an area of VRAM 212 corresponding to first 8 bits on a first line and a first column of the display panel, and an end address "017F" (hexadecimal notation) designates an area of VRAM 212 corresponding to sixteenth 8 bits on a third line and an eighth column of the display panel.

Figure 5:
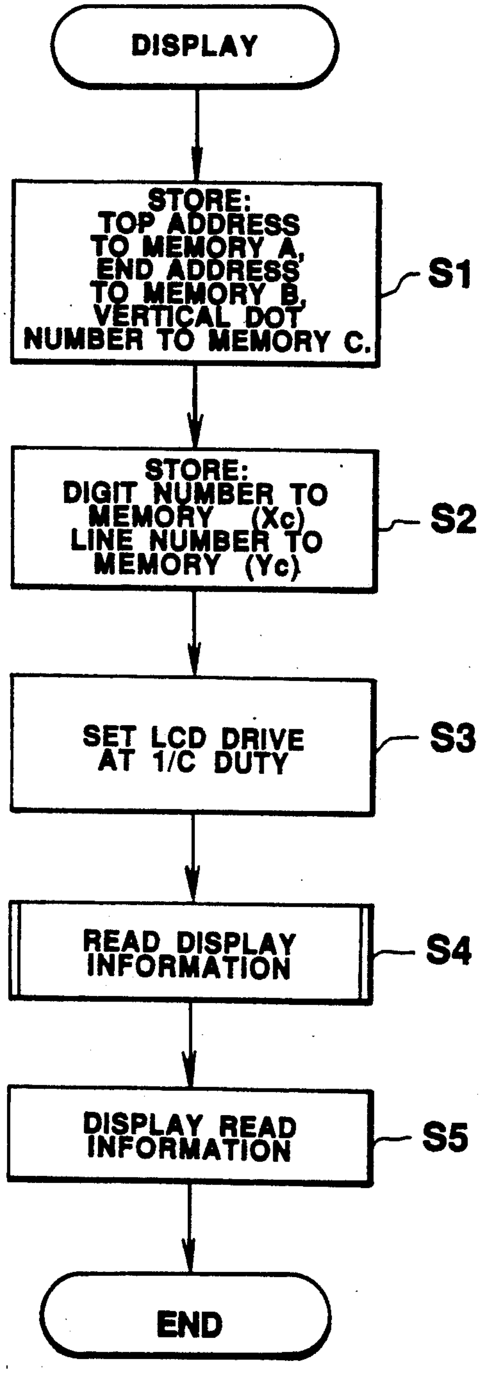
FIG. 5 is a flowchart for explaining a main display operation of the compact electronic appliance.

The display is executed in accordance with the flowchart represented in FIG. 5.

At a step S1 of this flowchart, the VRAM's top address "0000", VRAM's end address "017F", and dot number "48" in the vertical direction of the LCD panel 12 are read out from the display form memory 213 of the display unit 21 and then stored in the respective memory areas of the memory 183 in the display control unit 18. Subsequently, the display digit number "8" and display line number "3" are read from the display form memory 213, and thereafter stored into the memory 191 and memory 192 of the read control unit 19 at a step S2.

Then, the display process is advanced to a next step S3, the LCD PANEL 12 is driven at 1/C duty, 1/48 duty in this preferred embodiment, under the control of CPU 14. As will be described more in detail, the display information is read from the IC card 4 at a step S4 and displayed at a subsequent step S5.

The display information reading operations defined at the step S4 will now be explained with reference to flowcharts shown in FIGS. 6 and 7.

Figure 6:
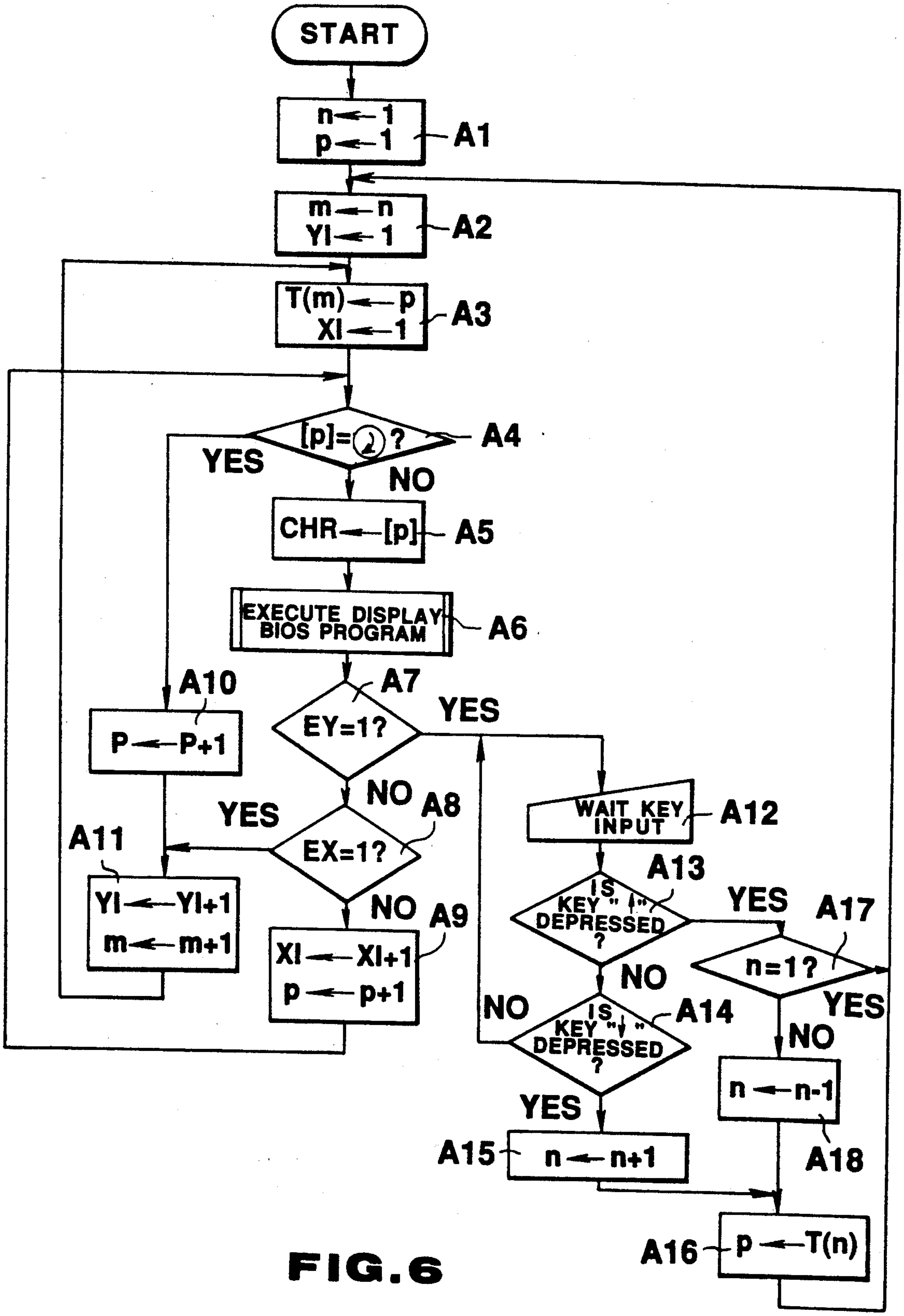
FIG. 6 is a flowchart for explaining an operation executed by a program stored in the IC card.

FIG. 6 is a flowchart for representing such a program that the display information, as shown in FIG. 4, on the IC card 4 per se is sent out to the housing 1. FIG. 7 is another flowchart for explaining a process to execute the display operations at the apparatus housing 1.

PROGRAM FOR TRANSFERRING DISPLAY INFORMATION

In the flowchart shown in FIG. 6, "1" is set into the display starting-line pointer (n) 171 employed in RAM 17 and the character pointer (p) 173 thereof so as to initialize this transfer program at a step A1. The display starting-line pointer (n) indicates the line number of which the information or characters are displayed on the first line of the display panel 12 when the actual display of the whole information becomes plural lines. The character point (p) indicates a position of the respective character data shown in FIG. 4. Subsequently, the display data transfer process is advanced to a step A2, the value "n" of the display starting-line pointer (n) 171, i.e., "1" in this stage, is written into the display line pointer (m) 172, and furthermore, "1" is written into the line position memory 182 for storing the line designation data (YI), so that a first line of the display unit 21 is designated. Next, this process is advanced to step A3, the value "p" of the character pointer (p) 173, i.e., "1" in this case, is written into the head character position buffer T(1). This indicates that the buffer T(1) stores such that the head character of the first line corresponds to "N" of character strings "NUMBER". Also, "1" is written into the digit position memory 181 for storing the digit designation data (XI), whereby the first digit of first column is designated. Then, the process is advanced to a step A4 in which a judgment is made whether or not the character corresponding to the character pointer (p) 173 is equal to the line-feed code. In this case, since the first character of the display character data shown in FIG. 4 corresponds to "N", not to the line-feed code, the judgment result becomes "NO" and the process is advanced to a next step A5.

At this step A5, the p-th character code is written into the display character code register (CHR) 175 employed in RAM 17. Thereafter, the process is advanced to a step A6. In this step A6, a display BIOS program shown in FIG. 7 previously stored in ROM 16 of the apparatus housing 1 is executed.

DISPLAY BIOS PROGRAM

Figure 7:
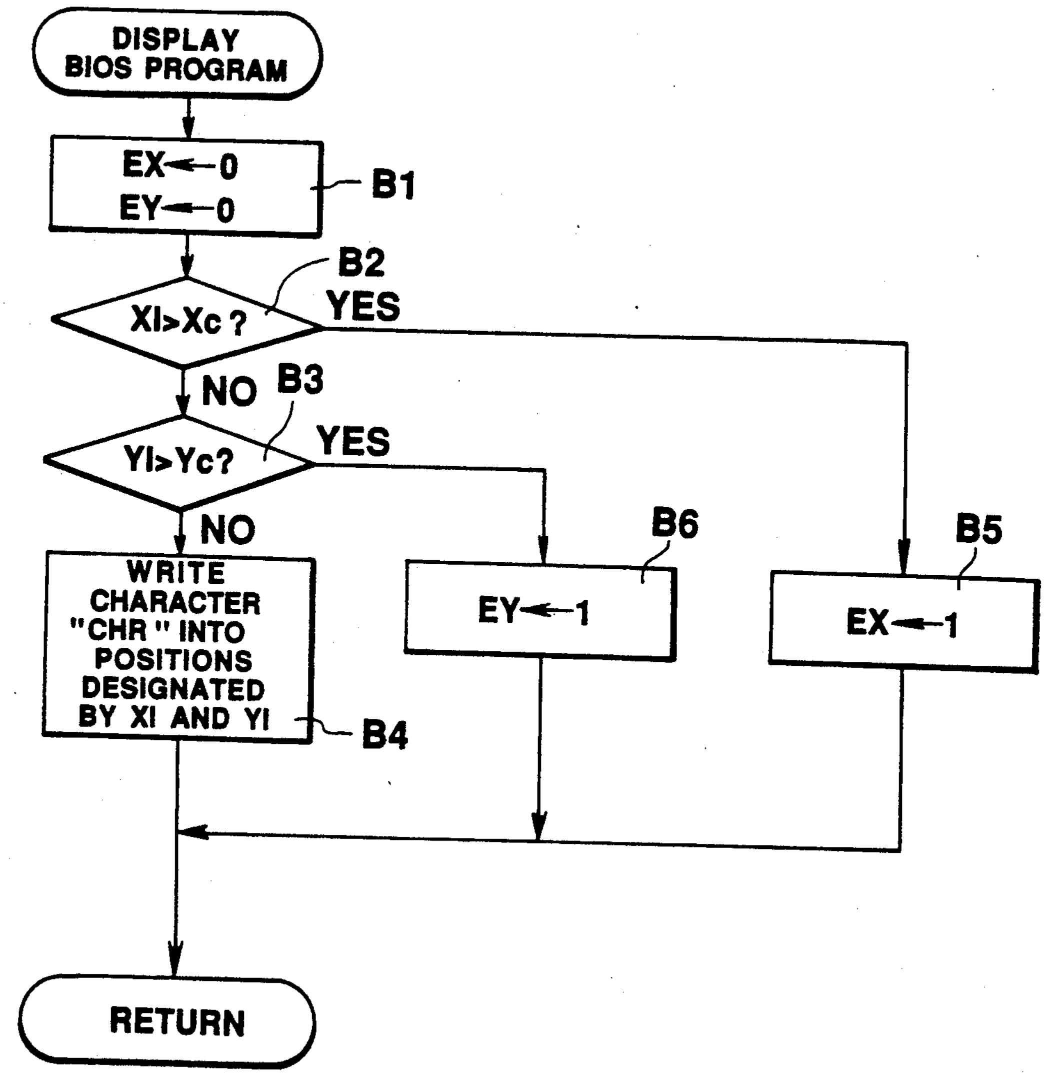
FIG. 7 is a flowchart for explaining an operation of various circuits of the compact electronic appliance during the display operation.

In a flowchart shown in FIG. 7, at a step B1, both the error flag memory (EX) 195 and error flag memory (EY) 196 are reset to "0".

Figure 8:
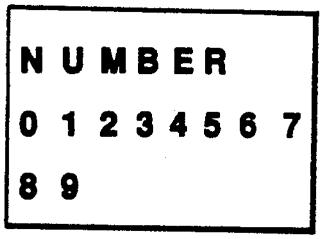
FIGS. 8 to 11 represent various display conditions of the display unit.

Next, the program is advanced to a step B2 in which a check is made whether or not the digit designation data (XI) of the memory 181 is greater than the display digit number data (Xc). At this stage, since XI=1 and Xc=8 and therefore the judgment result is NO, the display process is advanced to a step B3. At this step B3, another judgment is made whether or not the line designation data (YI) of the memory 182 exceeds over the display line number data (Yc). At this stage, since YI=1 and Yc=3 and thus the judgment result become NO, the display process is advanced to a step B4. At this step B4, the dot pattern of the character data "N" which has been written into the display character code register (CHR) 175 is accordingly written into the memory area of VRAM 212 corresponding to a first digit position in a first line of the display panel 12, as represented in FIG. 8. Then, this display process is returned to the flowchart shown in FIG. 6. Assuming now that a judgment of either XI>Xc or XI>Yc is made at the step B2 or B3, this implies that the character to be displayed is written outside the display panel 12, so that an error flag is set at the step B5 or B6 and then the process is returned to the flowchart shown in FIG. 6.

In FIG. 6, the display process is returned to a step A7. At the step A7, judgment is made whether or not "1" has been set at the error flag memory (EY) 196. In this case, as "1" is not set and therefore the judgment result becomes NO, the process is advanced to a step A8. At the step A8, another check is made whether or not "1" has been set in the error flag memory (EX) 195. Similarly, since "1" is not set in this error flag memory (EX) 195 and thus the judgment result becomes NO, the process is advanced to a further step A9.

At this step A9, the content of the digit position memory 181 for storing the digit designation data (XI) is incremented by 1 so as to designate the next position along the X direction, and the character pointer (p) 173 is incremented by "1" so that the next character is designated.

Thereafter, the process is returned to the step A4. The processes as defined from the step A4 to step A9 are repeatedly executed with respect to each character of the remaining characters "UMBER". As a result, the dot pattern of "NUMBER" is written into VRAM 212 corresponding to the first display line.

When the character pointer (p) 173 takes "7" and the line-feed code ↵ is designated, the judgment result becomes "YES" at the step A4, and the process is advanced to a step A10.

At this step A10, the character pointer (p) is set to "+1", namely "8", and thus the process is advanced to a step A11. At this step A11, both the line designation data (YI) and the display line pointer (m) are set to "+1" respectively. As a consequence, the character writing operation is moved to the second display line at the display panel 12. Then, the process is returned to the step A3.

At this step A3, the value "p" of the character pointer (p) 173, namely "8" in this stage, is written into the head character position buffer T(2) and such a memory content that the head character positioned at the second line corresponds to "0" is stored. Also, "1" is written into the digit position memory 181 for storing the digit designating data (XI) so as to designate the first digit of the display panel. As previously described, the various operations defined after the step A4 are performed.

When the steps A4 to A9 are repeatedly performed and "01234567" are written at the second line of the display, then "p" becomes 16, and the process is returned to the step A4. At this time, XI has become "9". Since a character "8" is designated by the character pointer (p=16), the character code of "8" is written into CHR 175 at the step A5. However, at the step A6, that is to say, at the step B2 of the flowchart shown in FIG. 7, a judgment is made that XI=9>Xc=8, "1" is set to the error flag memory (EX) 195. Then, since at the step A8, a judgment result becomes YES, the process is advanced to a step A11. At this step A11, the line designation data (YI) of the memory 182 is added by "1" and thus the third line is designated. Furthermore, the content of the display line pointer (m) 172 is set to "+1" whereby "3" is written. The process is returned to the step A3, in which the value "p" of the character pointer 173, namely "16" is written as the character position information to the head character position buffer T(3). As a result, it is stored that the head character at the third line corresponds to character "8" and "1" is written into the digit position memory 181 for storing the digit designating data (XI) in order to designate the first digit. Then, similarly, the process operations defined after the steps A4 are performed.

After the processes defined at the steps A4 to A9 have been performed, the characters "8" and "9" are written at the third line. When the second line-feed code ↵ is read by the character pointer 173 (p=18), the process is advanced to the steps A4, A10 and A11 so that "YI" is equal to "4". As a consequence, a judgment is made "YES" at the step B3 of the flowchart shown in FIG. 7, and then the process is advanced to the step B6 at which "1" is set into the error flag memory (EY) 196. Thus, at the step A7, a judgment is made "YES" and the process is advanced to a step A12. At this step A12, the character write operation is stopped the contents of VRAM 212 are displayed, and an input via key input unit 15 is waited. At this time, the display screen is represented in FIG. 8.

SCROLL OPERATION

Then, when the key input operation is performed by operating the key unit 15, judgments are made whether or not the key "↑" 13*a* or key "↓" 13*b* among the cursor key 13 is operated at steps A13 and A14. It should be noted that unless the key operation is effected at the key input unit 15, this condition is maintained. When the key "↓" 13*b* is manipulated, a judgment result becomes "YES" at a step A14 and the process is advanced to a next step A15. At this step A15, the display starting-line pointer (n) 171 employed in RAM 17 is added by "1" and thus "2" is written. Then, the process is advanced to a step A16. At this step A16, the stored value "8" is read out from the head character position buffer T(2), and then set as the value "p" of the character pointer (p) 173. Subsequently, the process is returned to the previous step A2. At this step A2, the value "n" of the display starting-line pointer (n) 171, namely "2" in this stage, is written in the display line pointer (m) 172, "1" is written into the line position memory 182 for storing the line designating data (YI) so as to designate the first line of the display.

Figure 9:
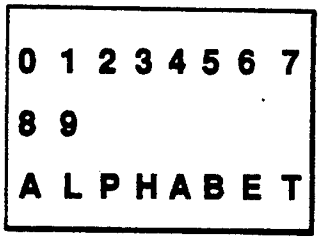

Thereafter, the processes as defined at the step A3 and also the succeeding steps are executed in the similar manner to the previous process operation. In other words, when the key "↓" 13*b* is manipulated, a screen with respect to the data display after the second line is newly performed. As a result, as represented in FIG. 9, a character "0" corresponding to "8" of the character point (p) 173 is displayed at a head position of the first line. Subsequently, the character is displayed on the display panel 12 constructed of 3 lines×8 columns based upon the display character data shown in FIG. 4.

On the other hand, when the keys "↑" 13*a* is depressed, a judgment result is made "YES" at the step A13, and the process is advanced to a step A17. At this step A17, a check is made whether or not the content of the display starting-line pointer (n) 171 of RAM 17 corresponding to "1". If "n" is equal to "1", since no scroll is performed in the reverse direction, the process is returned to the step A2 to form the same display.

If "n" is equal to any number other than "1" and the judgment result is "NO", the process is advanced to a further step A18. At this step A18, the display starting-line pointer (n) 171 employed in RAM 17 is subtracted by 1. At this stage, assuming now that the content of the display starting-line pointer (n) becomes "2" by operating the key "↓", this content again becomes "1", which will be then written into the display starting-line pointer (n) 171. Subsequently, the process is advanced to a step A16, at which the value "1" of the head character position buffer (1) is set to the value "p" of the character pointer (P) 173. Under this state, the process is returned to the previous step A2. A display screen may be formed by scrolling the characters in the reverse direction after step A2.

B-TYPE DISPLAY OPERATION

Figure 10:
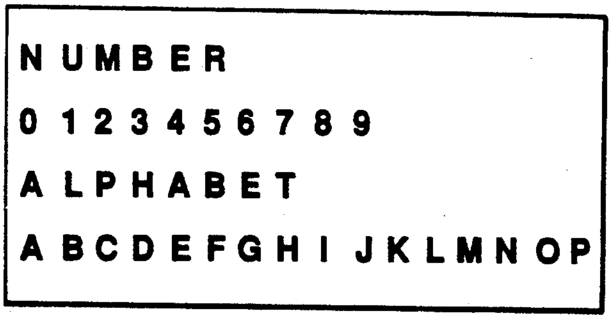

Next, in case that another display unit capable of displaying 4 lines×16 columns, i.e., B-type display (see FIG. 3) is used as the display panel 12 of the apparatus housing 1, (Xc) is set to "16" and (Yc) is set to "4". As a consequence, when the information shown in FIG. 4 is displayed on this B-type display unit, the various operations as defined in the same flowcharts as described above are executed, so that characters of "NUMBER" "0-9" "ALPHABET" and "A-P" are written in the respective lines after being processed by the line-feed codes, and finally displayed as shown in FIG. 10.

As a result of using this display system, even when the dimension of the display range for the display panel 12 is varied due to a modification of a sort of the display unit 21 employed in the apparatus housing 1, the characters from the IC card are written into the VRAM 212 while judging whether or not the display data exceeds the display range of the display panel 12 based upon the display column number (Xc) and display line number (Yc), whereby the data display is performed by effectivley utilizing the overall screen (area) of the display panel 12. Therefore, the display range of the display unit can be effectively utilized and better display appearances of the data can be achieved even when the display range of the display panel is changed, as compared with the conventional display system in which the data are displayed on only a portion of the display unit when the display range thereof is varied.

The present invention is not limited to the above-described preferred embodiments, but may be modified, substituted and changed without departing from the technical scope of the present invention.

Figure 11:
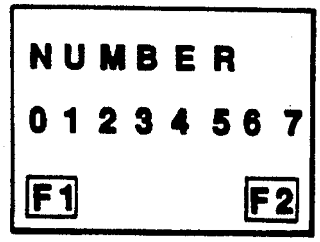

In the above-described preferred embodiments, both the display column number (Xc) and display line number (Yc) were fixedly set in accordance with the display range of the display panel 12. Alternatively, these display numbers (Xc) and (Yc) may be set as variable numbers in case that, for instance, another display such as a function display other than the display information of the IC card is made in the display screen. That is to say, when the function display is effected as shown in FIG. 11, (Yc) is selected to be "2", whereas when the function display is erased, (Yc) is selected to be "3". As a consequence, the display may be changed without carrying out a specific operation at the IC card 4. It is also possible to apply the display method according to the present invention to any display units having dimensions other thna 3 lines×8 columns and 4 lines×16 columns.

what is claimed is:

1. A display system for displaying character data stored in a memory device on a display unit, comprising:

a memory device including memory means for storing character data corresponding to a plurality of characters, and means for designating each of said plurality of characters stored in said memory means for display at a specified character position of a particular display screen with a display range having a predetermined number of display lines and a predetermined number of display columns;

a selected display screen coupled to said memory device and having a display range of a predetermined number of display lines and a predetermined number of display columns, the display ranges of said particular display screen and said selected display screen being different from each other;

display range memory means for storing said predetermined number of display lines and said predetermined number of display columns for the display range of said selected display screen;

character retrieving means for retrieving each of one of said plurality of characters from said memory device, and including display position indicating means for identifying at least by column said specified character position of each retrieved character;

character positioning means coupled to said character retrieving means and to said display range memory means for determining whether said specified character position designated by said memory device is within said display range of the selected display screen so that (a) if said specified character position designated by said memory device is within said display range of the selected display screen, assigning a character position related to said specified character position, and (b) if said specified character position designated by said memory device is not within said display range of the selected display screen, changing said specified character position to a reassigned character position within said display range of the selected display screen; and display memory means coupled to said display screen, and which stores said retrieved characters in accordance with said assigned or said reassigned character position.

2. The display system of claim 1, wherein among said plurality of characters stored in said memory means are line-feed codes representing a line end on said particular display screen for a sequence of such stored characters.

3. The display system of claim 1, wherein said character positioning means comprises means for comparing the column number of said specified character position of a retrieved character with said predetermined number of columns stored in said display range memory means.

4. The display system of claim 3, wherein said character positioning means includes means for storing the column number of the specified character position of said retrieved character, and for providing an output therefrom to said comparing means.

5. The display system of claim 4, wherein said character positioning means, for said retrieved character having said column number in said specified character position thereof which is determined to exceed said display range, reassigns the line number of such character to the next line of said display screen.

6. The display system of claim 5, wherein said character positioning means positions a sequence of reassigned characters to begin from the first column.

7. The display system of claim 4, wherein said character positioning means comprises means for indicating the line number of the display screen to which a last retrieved, but not yet displayed, character has been assigned, and means for comparing the line number of said indicating means with said display range and, if the predetermined line number of the display range has been exceeded, displaying the retrieved characters stored in said display memory means.

8. The display system of claim 1, wherien said memory device is an integrated circuit card.

* * * * *

UNITED STATES PATENT AND TRADEMARK OFFICE
CERTIFICATE OF CORRECTION

PATENT NO. : 5,218,675

DATED : June 8, 1993

INVENTOR(S) : Tatsuo ARAI et al

It is certified that error appears in the above-identified patent and that said Letters Patent is hereby corrected as shown below:

Title page, Section [56] References Cited,
Under "U.S. PATENT DOCUMENTS"

Insert: --4,523,297 6/1985 Ugon et al 364/900
4,890,832 1/1990 Komaki 273/1E--.

Signed and Sealed this

Seventeenth Day of January, 1995

Attest:

BRUCE LEHMAN

*Attesting Officer*

*Commissioner of Patents and Trademarks*